United States Patent
Lee et al.

(10) Patent No.: US 9,761,333 B2
(45) Date of Patent: Sep. 12, 2017

(54) PASSIVE AUXILIARY CONDENSING APPARATUS OF NUCLEAR POWER PLANT

(75) Inventors: Sang Jong Lee, Daejeon (KR); Sang Jung Park, Daejeon (KR); Jae Don Choi, Daejeon (KR); Jong Jin Kim, Daejeon (KR); Seok Hee Ryu, Daejeon (KR); Jung Won Sun, Daejeon (KR); Ja Young Kim, Daejeon (KR); Kyung Min Yoon, Daejeon (KR); Geun Tae Park, Daejeon (KR); Seoung Eun Chun, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 899 days.

(21) Appl. No.: 13/595,560

(22) Filed: Aug. 27, 2012

(65) Prior Publication Data
US 2013/0064341 A1 Mar. 14, 2013

(30) Foreign Application Priority Data
Sep. 8, 2011 (KR) .................. 10-2011-0091160

(51) Int. Cl.
G21C 15/16 (2006.01)
G21C 15/18 (2006.01)

(52) U.S. Cl.
CPC ............. *G21C 15/16* (2013.01); *G21C 15/18* (2013.01); *Y02E 30/40* (2013.01)

(58) Field of Classification Search
CPC .................. G21C 15/16; G21C 15/18
(Continued)

(56) References Cited

U.S. PATENT DOCUMENTS 4,765,946 A * 8/1988 Dagard .................. G21C 15/18
165/285
5,398,267 A * 3/1995 Reinsch .................. 376/298
(Continued)

FOREIGN PATENT DOCUMENTS

JP  2006-138744 A   6/2006
KR  10-2002-0037105 A  5/2002
KR  10-2010-0134277 A  12/2010

OTHER PUBLICATIONS

Lee, Seong-Wook, Won-Pil Baek, and Soon Heung Chang. "Assessment of passive containment cooling concepts for advanced pressurized water reactors." Annals of Nuclear Energy 24.6 (1997):467-75. <http://www.sciencedirect.com/science/article/pii/S0306454996000801/pdf?md5=ed719ae1686e06feef9271f220d2dca5&pid=1-s2.0-S0306454996000801-main.pdf>.*
(Continued)

*Primary Examiner* — Jack W Keith
*Assistant Examiner* — Lily C Garner
(74) *Attorney, Agent, or Firm* — Rabin & Berdo, P.C.

(57) ABSTRACT

A passive auxiliary condensing apparatus of a nuclear power plant includes a steam generation unit configured to heat a water supplied thereto into a steam by a heat produced when operating a nuclear reactor, a water cooled heat exchange unit connected to the steam generation unit and configured to store a cooling water therein to condense the steam provided from the steam generation unit, and a steam-water separation tank including a first side connected to the water cooled heat exchange unit and a second side connected to the steam generation unit, wherein a mixture of a water and a steam provided from the water cooled heat exchange unit is separated into the water and the steam to provide only the water to the steam generation unit.

3 Claims, 4 Drawing Sheets

(58) Field of Classification Search
USPC .................................. 376/298, 407, 299, 392
See application file for complete search history.

(56) References Cited

U.S. PATENT DOCUMENTS

| | | | | |
|---|---|---|---|---|
| 5,426,681 A | * | 6/1995 | Aburomia | G21C 9/004 376/282 |
| 6,081,573 A | * | 6/2000 | Akimoto | B66C 1/66 376/254 |
| 2008/0095294 A1 | * | 4/2008 | Andrew | F01K 23/101 376/210 |

OTHER PUBLICATIONS

Kim, Han Gon. Development of Passive Aux. eedwater System in ALWR in Korea. Oct. 29, 2009. p. 5. <https://www.iaea.org/INPRO/CPs/AWCR/2nd_Meeting/Korea-Presentation.pdf>.*
Han Gon Kim et al., "Design of the Passive Aux. Feedwater System in the Korea Advanced NPP", KSME2010R2022, 2010, pp. 101-102.

* cited by examiner

PASSIVE AUXILIARY CONDENSING APPARATUS OF NUCLEAR POWER PLANT

CROSS-REFERENCE TO RELATED APPLICATIONS

The present application claims priority benefits under 35 U.S.C. §119 to Korean Patent Application No. 10-2011-0091160, filed Sep. 8, 2011.

BACKGROUND OF THE INVENTION

1. Field of the Invention

The present invention relates to a passive auxiliary condensing apparatus of a nuclear power plant, and more particularly to a passive auxiliary condensing apparatus, which is an auxiliary feedwater system for cooling a nuclear core of a nuclear power plant in an event of an accident.

2. Description of the Related Art

An auxiliary feedwater system is provided in a nuclear power plant to ensure safety in operating a nuclear reactor.

Such auxiliary feedwater system includes a passive auxiliary feedwater system (PAFS), which is a well known passive auxiliary cooling system in which a steam pipe is connected to outlet of a steam generator and the steam pipe is configured to pass through a cooling water tank, which is separately provided, to condense a steam outputting from the steam pipe, thereby supplying a feedwater.

Meanwhile, a prior art emergency core cooling system is disclosed in Korea Patent Publication No. 2002-0037105, which is published May 18, 2002.

In order to secure safety in the nuclear power plant, a method of cooling a secondary system of the nuclear reactor may be used.

However, such conventional cooling system is of an active type, which can be operated only by an electricity supply. Thus, the conventional cooling system has a problem such that it cannot be operated when an accident occurs in which the electricity supply is interrupted.

In order to solve the above described problem, as shown in FIG. 1, a conventional passive auxiliary feedwater system (PAFS) 10 includes a steam generator 30 connected to a reactor vessel 20 and a cooling tank 50 including a heat exchanger 40 installed therein, wherein the heat exchanger 40 is connected to the steam generator 30.

A steam outputted from an upper portion of the steam generator 30 is introduced to the heat exchanger 40 and passes through the cooling tank 50 so that the steam is condensed so that a water liquid returns to a lower portion of the steam generator 30.

However, in the conventional passive feedwater system 10 described above, a water, which is generated by the steam passing through the heat exchanger 40 and the cooling tank 50 and is recovered by the steam generator 30 is not a 100% liquid water but is a mixture of a water and steam. Therefore, a vibration can be caused during when the mixture of the water and steam is re-introduced to the steam generator 30 and a shock wave can be generated during when a remaining steam is condensed into the water, thereby damaging the system. Also, a quality of a cooling water re-introduced into the steam generator 30 can be lowered.

SUMMARY OF THE INVENTION

Accordingly, the present invention has been made keeping in mind the above mentioned problems occurring in the related art, and an object of the present invention is to provide a passive auxiliary condensing apparatus, which can avoid generation of a vibration or a shock wave by preventing a steam from being mixed into a water to be re-produced into a steam generator during when removing a core decay heat (or residual heat) in a passive manner, even in a case where an electricity supply is interrupted due to an accident.

Here, the steam-water separation tank preferably includes a steam water inflow pipe positioned on a lower side portion of the steam-water separation tank and connected to the water cooled heat exchange unit, and a water discharge pipe positioned on a lower surface of the steam-water separation tank and connected to the steam generation unit.

The steam-water separation tank is preferably provided in a longer cylindrical shape in a longitudinal direction.

A steam pipe positioned between the steam generation unit and the water cooled heat exchange unit is preferably provided to connect therebetween.

A bypass pipe positioned between the steam pipe and the steam-water separation tank is preferably provided.

The bypass pipe preferably includes a control valve and a check valve.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Exemplary embodiments of the present invention will be described herein below with reference to the accompanying drawings.

Figure 1:
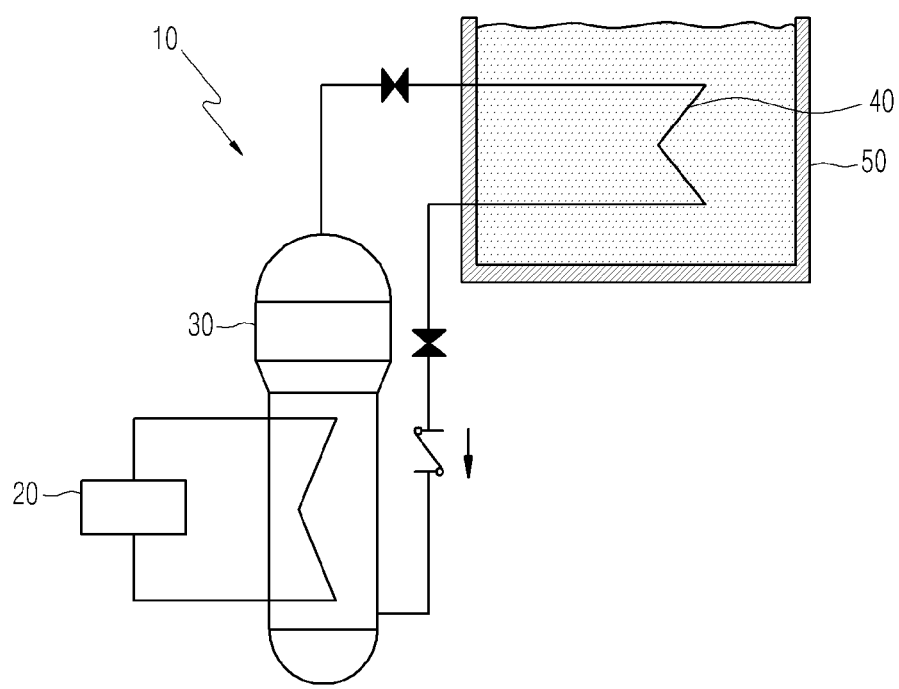
FIG. 1 is a configuration view of a conventional passive auxiliary feedwater system of a nuclear power plant.
Figure 2:
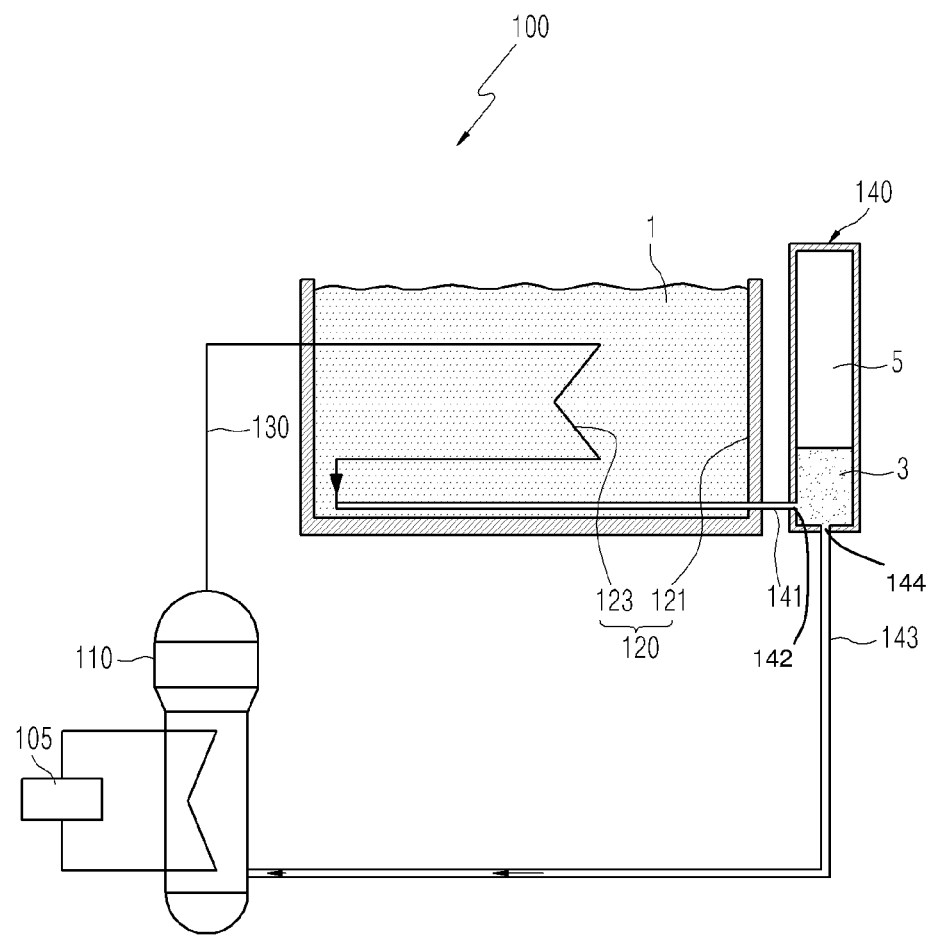
FIG. 2 is a configuration view of a passive auxiliary feedwater system of a nuclear power plant according to an exemplary embodiment of the present invention.
Figure 3:
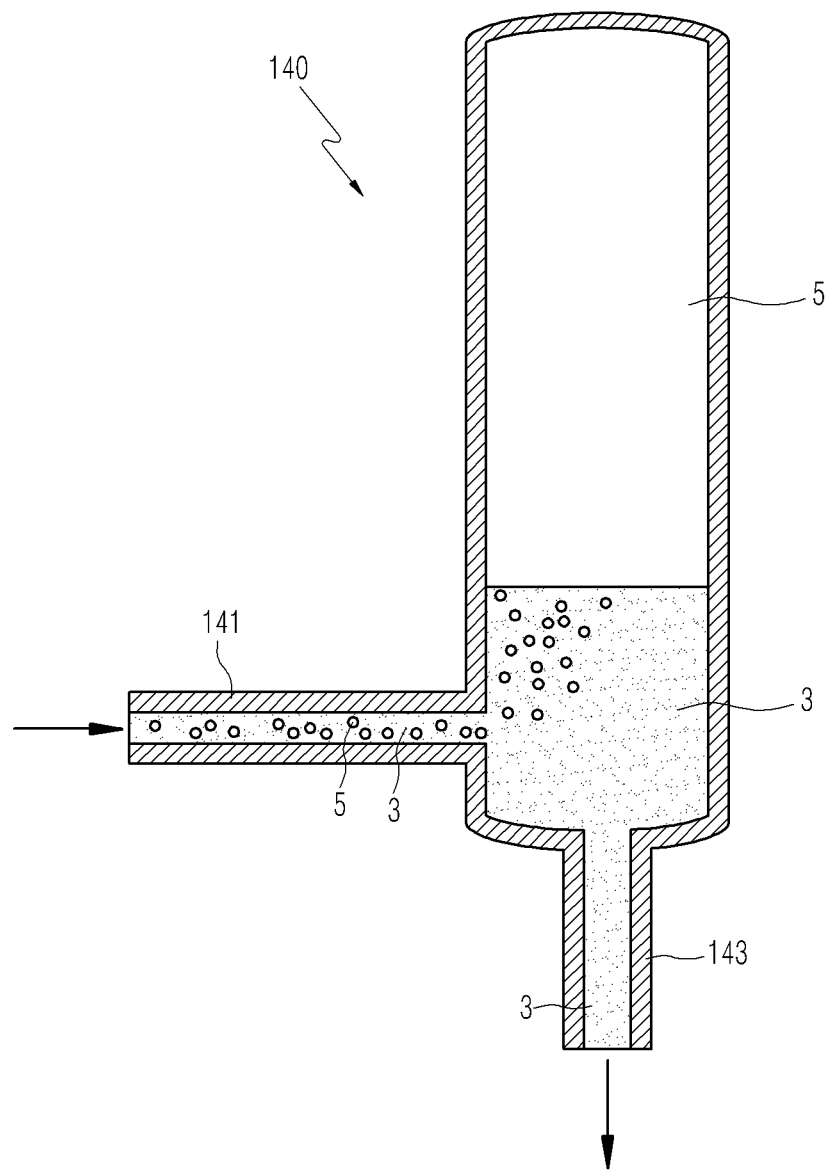
FIG. 3 is an enlarged view of a steam-water separation tank of FIG. 2.

As shown in FIGS. 2 and 3, a passive auxiliary condensing apparatus 100 of a nuclear power plant according to an exemplary embodiment of the present invention can apply to a passive auxiliary feedwater system (PAFS) that is used to secure safety of a nuclear reactor. The passive auxiliary condensing apparatus 100 includes a steam generation unit 110 connected to a reactor vessel 105, wherein a water provided from a steam-water separation tank 140, which will be described later, is heated to turn into a steam by a heat generated during an operation of a nuclear reactor, a water cooled heat exchange unit 120 connected to the steam generation unit 110, wherein the water cooled heat exchange unit 120 includes a cooling water 1 stored therein to condense a steam provided from the steam generation unit 110, and the steam-water separation tank 140 having a first side connected to the water cooled heat exchange unit 120 and a second side connected to the steam generation unit 110 such that a water 3 and a steam 5 can be separated to provide only the water 3 to the steam generation unit 110 when a mixture of the water 3 and the steam 5 is introduced therein from the water cooled heat exchange unit 120.

Accordingly, a steam is generated by the steam generation unit 110 through a heat exchange among primary systems (reactor-hot leg pipe-steam generation unit-coolant pump-cold leg pipe-nuclear reactor). The generated steam passes through the water cooled heat exchange unit 120 of the passive auxiliary feedwater system (PAFS) to be condensed into a water, which is introduced to the steam-water separation tank 140. Accordingly, the passive auxiliary condensing apparatus 100 of the nuclear power plant can be operated in a passive manner in an auxiliary feedwater system such that a nuclear core decay heat (or residual heat) can be cooled down even when an electricity supply is interrupted due to an accident. Also, the steam is prevented from mixed into the water reintroduced to the steam generation unit 110 of the passive auxiliary condensing apparatus 100 by using the steam-water separation tank 140, thereby avoiding generation of a vibration or a shock wave. Further, a cooling water re-introduced to the steam generation unit 110 may have an improved quality.

As shown in FIG. 3, according to an exemplary embodiment of the present invention, the steam-water separation tank 140 is provided in a longer cylindrical shape in a longitudinal direction such that, when the mixture of the water 3 and the steam 5 is received from the water cooled heat exchange unit 120, the water 3 and the steam 5 may be separated to provide only the water 3 to the steam generation unit 110.

The water cooled heat exchange unit 120, as shown in FIG. 2, includes a cooling tank 121 for storing the cooling water 1 and a heat exchanger 123 installed in the cooling tank 121, wherein the heat exchanger 123 is submerged in the cooling water 1 and connected to the steam generation unit 110, thereby condensing the steam provided from the steam generation unit 110.

The steam-water separation tank 140, as shown in FIGS. 2 and 3, includes a steam water inflow pipe 141, which connects an inlet hole 142 formed in a side wall of the steam-water separation tank 140 and an outlet of the heat exchanger 123 of the water cooled heat exchange unit 120 to allow an inflow of the water produced by condensing the steam passing through the heat exchanger 123, and a water discharge pipe 143, which connects an outlet hole 144 formed in a bottom wall of the steam-water separation tank 140 and a lower portion of the steam generation unit 110 to supply only the water 3 to the steam generation unit 110.

Accordingly, even when the mixture of the steam 5 and the water 3 is introduced from the heat exchanger 123 to the steam-water separation tank 140 through the steam water inflow pipe 141, the steam 5, which has a relatively lower density, is carried upward in the steam-water separation tank 140 and the water 3, which has a relatively heavier weight, is carried downward due to convection, so that only the water 3 can be discharged by the water discharge pipe 143 provided on the lower surface of the steam-water separation tank 140. Here, the steam 5 carried upward in the water steam separation tank 140 can be slowly condensed to the water 3 at a boundary between the steam 5 and the water 3, thereby facilitating a water supply to the steam generation unit 110.

Specifically, it is preferable that the steam-water separation tank 140 has a diameter which is equal to or less than one tenth of a diameter of the cooling tank 121.

In addition, as shown in FIG. 2, the nuclear reactor cooling system 100 according to the present invention further includes a steam pipe 130, which is positioned between the steam generation unit 110 and the heat exchanger 123 of the water cooled heat exchange unit 120 such that the steam generation unit 110 is connected to the heat exchanger 123 of the water cooled heat exchange unit 120.

Figure 4:
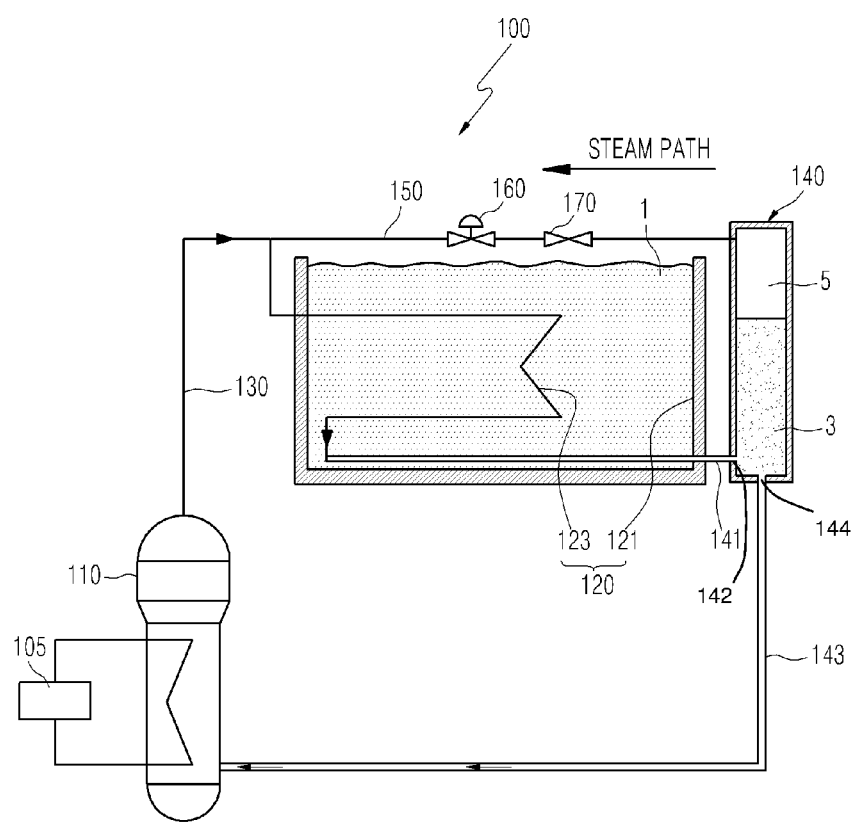
FIG. 4 is a configuration view of a passive auxiliary feedwater system of a nuclear power plant according to another exemplary embodiment of the present invention.

Meanwhile, as shown in FIG. 4, according to another embodiment of the present invention, the nuclear reactor cooling system 100 may further include a bypass pipe 150, which is separated from the steam pipe 130 and connected to the steam-water separation tank 140. Here, the bypass pipe 150 preferably includes a control valve 160 and a check valve 170. In addition, the bypass pipe 150 is preferably connected to an upper portion of the steam-water separation tank 140.

Accordingly, it is possible that the steam 5 collected in the steam-water separation tank 140 is reintroduced to the steam pipe 130 to be recovered by the water cooled heat exchange unit 120.

A method of operating the passive auxiliary condensing apparatus 100 of the nuclear power plant according to the present invention having the above described configuration will be described with reference to FIGS. 2 through 4.

First, the steam 5 generated in the steam generation unit 110 has a relatively lower density so that the steam rises upward due to convection and is introduced to the heat exchanger 123 of the water cooled heat exchange unit 120 through the steam pipe 130.

Next, the steam introduced to the heat exchanger 123 passes through the heat exchanger 123 and allows extraction of heat by the coolant 1 stored in the cooling tank 121 such that the steam is condensed into water, which is pulled downward by gravity.

Next, the condensed water 3 is introduced into the steam water tank 140 through the water steam inlet pipe 141. Here, since the water 3 introduced to the steam-water separation tank 140 is usually not completely condensed, and thus, the mixture of the water 3 and the steam 5 is introduced to the steam water tank 140.

The steam 5 rises upward within the steam-water separation tank 140 and the water 3 is moved downward to be discharged through the water discharge pipe 143 provided on the lower surface of the steam-water separation tank 140 to be reintroduced to the steam generation unit 110.

According to the present invention, the steam 5 is prevented from mixing with the water 3, which is reintroduced to the steam generation unit 110 of the passive auxiliary condensing apparatus 100, by using the steam-water separation tank 140, thereby avoiding the generation of the vibration or the shock wave. Also, the quality of the cooling water reintroduced to the steam generation unit 110 can be improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A passive auxiliary condensing apparatus of a nuclear power plant, the passive auxiliary condensing apparatus comprising:
   a steam generation unit generating steam by a heat produced when operating a nuclear reactor;
   a cooling tank disposed outside the steam generation unit and storing cooling water therein;
   a heat exchanger installed inside the cooling tank and condensing the steam provided from the steam generation unit by the cooling water of the cooling tank, the heat exchanger having an inlet and an outlet;

a steam pipe connecting an upper portion of the steam generation unit and the inlet of the heat exchanger such that the steam from the steam generation unit flows into the heat exchanger through the steam pipe;

a steam-water separation tank disposed side by side with the cooling tank separately from each other, wherein the steam-water separation tank separates a mixture of water and steam provided from the heat exchanger into the water and the steam respectively and includes an inlet hole formed in a side wall of the steam-water separation tank, an outlet hole formed in a bottom wall of the steam-water separation tank, an inlet pipe having a first end and a second end, wherein the first end of the inlet pipe is connected to the inlet hole of the steam-water separation tank and the second end of the inlet pipe is connected to the outlet of the heat exchanger such that the mixture from the heat exchanger flows into the steam-water separation tank through the inlet pipe, and an outlet pipe having a first end and a second end, wherein the first end of the outlet pipe is connected to the outlet hole of the steam-water separation tank and the second end of the outlet pipe is connected to a lower portion of the steam generation unit such that the water from the steam-water separation tank flows into the steam generation unit; and a bypass pipe including a check valve and connecting the inlet of the heat exchanger and an upper portion of the steam-water separation tank such that the steam flows from the steam-water separation tank to the heat exchanger without passing through the steam generation unit, wherein the steam provided from the steam generation unit circulates through the steam generation unit, the steam pipe, the heat exchanger, the inlet pipe of the steam-water separation tank, the steam-water separation tank, the outlet pipe of the steam-water separation tank and the steam generation unit.

2. The passive auxiliary condensing apparatus according to claim 1, wherein the steam-water separation tank has a cylindrical shape elongated in a longitudinal direction.

3. The passive auxiliary condensing apparatus according to claim 1, wherein the bypass pipe further includes a control valve.

* * * * *